United States Patent [19]

Kirkpatrick et al.

[11] Patent Number: 5,160,757
[45] Date of Patent: Nov. 3, 1992

[54] PROCESS FOR MAKING REDUCED DENSITY COFFEE

[75] Inventors: Steven J. Kirkpatrick, Cincinnati; Richard W. Bertagna, Mason; Roger W. Gutwein, Cincinnati, all of Ohio

[73] Assignee: The Procter & Gamble Company, Cincinnati, Ohio

[21] Appl. No.: 737,576

[22] Filed: Jul. 26, 1991

Related U.S. Application Data

[63] Continuation of Ser. No. 633,634, Dec. 21, 1990, abandoned, which is a continuation-in-part of Ser. No. 374,424, Jun. 30, 1989, abandoned.

[51] Int. Cl.$^5$ .............................................. A23F 5/04
[52] U.S. Cl. ................................ 426/466; 426/595; 426/467; 426/468; 426/469
[58] Field of Search .................... 426/595, 466–469

[56] References Cited

U.S. PATENT DOCUMENTS

| | | |
|---|---|---|
| 2,444,217 | 6/1948 | Armentrout . |
| 3,106,470 | 10/1963 | Mentvale . |
| 3,572,235 | 3/1971 | Nutting et al. . |
| 3,589,912 | 6/1971 | Adler et al. ........................ 426/466 |
| 3,615,667 | 10/1971 | Joffe . |
| 3,634,094 | 1/1972 | Ponzoni et al. ..................... 426/595 |
| 3,652,293 | 3/1972 | Lombana et al. . |
| 3,660,106 | 5/1972 | McSwiggin et al. . |
| 3,964,175 | 6/1976 | Sivetz ..................................... 34/57 |
| 3,989,849 | 11/1976 | Fogel et al. ..................... 426/427 X |
| 4,110,485 | 8/1978 | Grubbs et al. . |
| 4,161,549 | 7/1979 | Ohno .............................. 426/466 X |
| 4,169,164 | 9/1979 | Hubbard et al. .................. 426/467 |
| 4,207,352 | 6/1980 | Kurzhals et al. ............... 426/595 X |
| 4,267,200 | 5/1981 | Klein et al. . |
| 4,322,447 | 3/1982 | Hubbard . |
| 4,331,696 | 5/1982 | Bruce . |
| 4,349,573 | 9/1982 | Stefanucci et al. ................ 426/388 |
| 4,430,353 | 2/1984 | Yadlowsky ........................ 426/388 |
| 4,501,761 | 2/1985 | Mahlmann et al. ................ 426/467 |
| 4,540,591 | 9/1985 | Dar et al. . |
| 4,737,376 | 4/1988 | Brandlein et al. ............. 426/467 X |
| 4,988,590 | 1/1991 | Price et al. . |
| 5,019,413 | 5/1991 | Becker et al. ....................... 426/460 |

FOREIGN PATENT DOCUMENTS

| | | |
|---|---|---|
| 132877 | 2/1985 | European Pat. Off. . |
| 337541 | 10/1989 | European Pat. Off. . |
| 2531390 | 7/1975 | Fed. Rep. of Germany . |
| 1274806 | 5/1972 | United Kingdom . |

OTHER PUBLICATIONS

Lerici et al., Production of High-Yield Coffee—Note 1 Roasting Experiments, Industrie Alimentari, Dec. 1985, pp. 991–994; 1000 (with Translation).

Brochure—Leogap Rapido, Metalurgica Leogap SA (Date of publication unknown—sometime before Nov. 14, 1989).

Sivetz et al., Coffee Technology, "Green Coffee Technology" AVI Publishing Co., Westport, CT (1979) pp. 134–135, 226–246, 250–262, 265–276 and 561.

Fellows, Food Processing Technology, Chapters 14, 17, and 20 (1988).

Hunter, Photoelectric Color Difference Meter, J. of the Optical Soc. of America, 48, pp. 985–995 (1958).

*Primary Examiner*—Joseph Golian
*Attorney, Agent, or Firm*—Gary M. Sutter; Ronald L. Hemingway

[57] ABSTRACT

This invention relates to an improved process for preparing reduced density roast coffee beans. The improved process comprises predrying green coffee beans to a moisture content of from about 0.5% to about 10% by weight, fast roasting the beans, and cooling the roasted beans. The resulting roasted beans have a Hunter L-color of from about 14 to about 25, a Hunter $\Delta L$-value is less than about 1.2 and a whole roast tamped bulk density of from about 0.28 to about 0.38 g/cc. The resulting roast coffee beans are more uniformly roasted than traditional reduced density coffee beans.

11 Claims, 1 Drawing Sheet

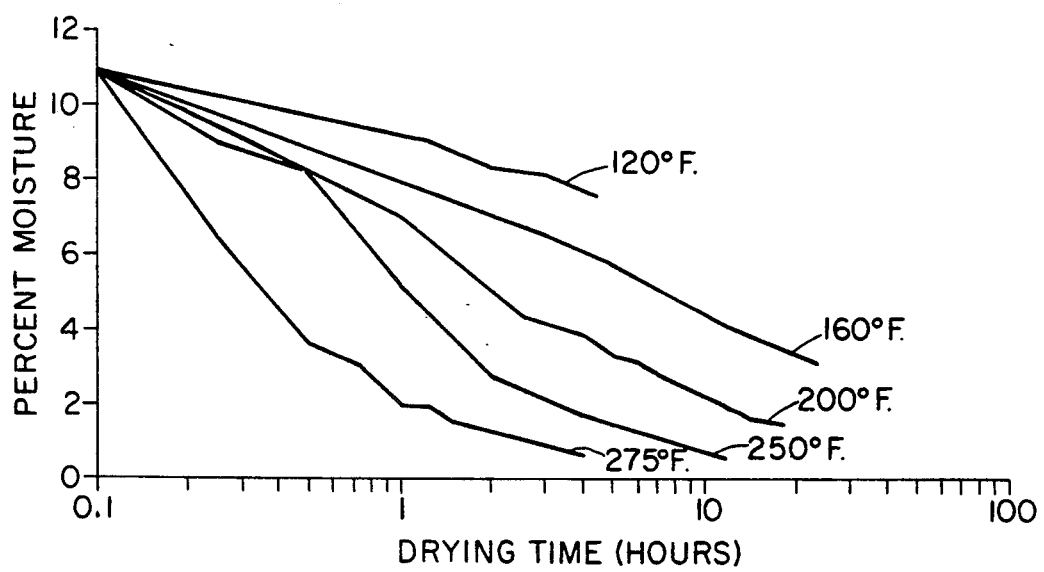

PROCESS FOR MAKING REDUCED DENSITY COFFEE

RELATED APPLICATIONS

This is a continuation of application Ser. No. 07/633,634, filed Dec. 21, 1990, now abandoned, which was a continuation-in-part of application Ser. No. 07/374,424, filed Jun. 30, 1989, now abandoned.

BACKGROUND

Historically roast and ground coffee has been marketed on supermarket shelves by weight in 16-ounce cans. However, a recent trend in the coffee market has resulted in the demise of the 16-ounce weight standard. This trend emerged in 1988, when major coffee manufacturers began marketing 13-ounce blends. The blends were prepared using "fast roast" technology that resulted in a lower density bean. Thirteen ounces of these lower density blends have nearly the same volume as the traditional 16-ounce blends. As a result they could be marketed in the old 1-pound cans and were priced about 20 cents below the previous 16-ounce list price because they used fewer beans. This down-weighting of coffee in cans has met with widespread acceptance in the industry.

Many recent "fast roast" coffees also have a higher yield of brew solids than previous 16-ounce coffees. These high yield fast roast and ground coffees exhibit improved extraction characteristics during brewing. Thus, they can make as many cups of coffee (or more) per 13 ounces as were previously prepared from 16 ounces.

Fast roasting results in a puffed or somewhat popped bean. Fast roasting of coffee typically occurs in large multistage roasters (e.g., Probat, Thermalo, Jetzone, etc.) with very large heat inputs. These high heat inputs result in the rapid expansion of the roasted bean.

Fast roast processing is not without its shortcomings. The high heat inputs necessary to puff the bean result in a high degree of bean roasting variation within the roaster. Also, tipping and burning of the outer edges of the bean are a major problem.

It is therefore an object of the present invention to produce a reduced density roast coffee bean that is more uniformly roasted.

It is also an object of the present invention to produce roast beans with less bean-to-bean color variation and less color variation within each bean.

Another object of the present invention is to produce roast coffee beans with less tipping and burning of the outer edges of the roasted bean than conventionally fast roasted beans.

These and other objects of the invention will become clear by the disclosure herein.

BACKGROUND ART

A. Moisture Content of Exported Green Beans

Sivetz et al., *Coffee Technology*, "Drying Green Coffee Beans", pp. 112-169 (1979), states that coffee beans are dried prior to export. Historically, solar drying was the method of choice. However, improved reliability and efficiency of machine dryers has led to their widespread use in the industry. The standard moisture target prior to export is about 12%. Sivetz also highlights the irreversible damage overdrying can have on coffee quality.

B. The Effect of Green Bean Moisture Content on Roasted Density

Sivetz et al., *supra*, "Coffee Bean Processing", pp. 254-6 states that the bulk density of roasted bean will vary with degrees of roast, speed of roast, and original moisture content of the green beans. Sivetz goes on to say: "[f]ast roasts on large beans, especially new-crop coffees with more than average moisture, may cause a 10-15% larger swelling than normal." (emphasis added)

In a discussion of bean roasting, Clifford, *Tea and Coffee Trade Journal*, "Physical Properties of the Coffee Bean", pages 14-16, Apr. 1986, states "Production of carbon dioxide, and its expansion along with water vapor, generate internal pressures in the range of 5.5 to 8.0 atmospheres and account for the swelling of the bean by some 170 to 230%.

U.S. Pat. No. 4,737,376, Brandlein et al., issued Apr. 12, 1988, describes a two-stage bubbling bed roasting process for producing low density (0.28 to 0.34 g/cc) coffee. During Stage 1 the beans are heated at 500° to 630° F. (260° F.-332° C.) for from 0.25 to 1.5 minutes at atmospheric pressure. During Stage 2 the beans are heated at a temperature equal to or less than Stage 1 for from 0.25 to 1.5 minutes at atmospheric pressure. The '376 patent discusses the importance of retaining a high internal bean moisture. It is stated that high internal bean moisture promotes hydrolysis reaction and allows the beans to remain more pliable during roasting. This is said to allow for greater expansion of the bean during roasting. Typically, the beans fed into the Stage 1 roaster have a moisture content of $10\pm2\%$.

SUMMARY OF THE INVENTION

The present invention relates to a process for producing reduced density roasted coffee beans comprising the steps of: (1) pre-drying green coffee beans to a moisture content of from about 0.5% to about 10% by weight, (2) fast roasting the beans; and (3) cooling the roasted beans. The resulting roasted beans have a Hunter L-color of from about 14 to about 25, a Hunter $\Delta$L-color of less than about 1.2 and a whole roast tamped bulk density of from about 0.28 to about 0.38 g/cc. The product beans can be ground or ground and flaked after roasting.

The present invention also relates to the reduced density coffee bean product and the resulting ground/flaked products.

BRIEF DESCRIPTION OF THE DRAWING

FIG. 1 shows a typical drying curve for a typical blend of green coffee beans having an initial moisture content of 11% that are air-dried on a model 42200 Wenger belt dryer under 300 pound (136 kg) batch conditions. The blend consists of equal parts Robusta, natural Arabica, and washed Arabica beans.

DETAILED DESCRIPTION OF THE INVENTION

All percents and ratios used herein are on a weight basis unless otherwise indicated.

Definitions

As used herein, the term "reduced density coffee" relates to roasted coffee which has a roasted whole bean tamped density of from about 0.28 to 0.38 gm/cc.

As used herein, the term "1-pound coffee can" relates to a coffee container which has a volume of 1000 cc.

Historically, one pound (16 oz.) of coffee was sold in this volume container.

As used herein, the term "pre-drying" relates to a green bean moisture removal operation which occurs prior to roasting, typically, less than 1 day prior to roasting.

As used herein, the terms "tipping" and "burning" relate to the charring of the ends and outer edges of a bean during roasting. Tipping and burning of beans results in a burnt flavor in the resulting brewed beverage.

The term "density", as used herein, refers to bulk density, i.e. the overall density of a plurality of particles measured after vibratory settlement.

As used herein, the term "percent moisture" relates to the amount of water in a green bean, a roasted bean or ground and roasted bean on a wet-basis. Moisture content is determined by oven drying. First, the material is ground to a mean particle size of about 900 $\mu$m. Ten grams of ground material is then weighed into a drying dish and placed in a 105° C. drying oven for 16 hours. The weight loss from the sample represents the moisture in the original sample and, accordingly, is used to calculate the percent moisture.

Pre-drying of Coffee Prior to Roasting

It has now surprisingly been discovered that reduced density coffee can be produced from green coffee beans having a moisture content of less than about 10%. This discovery is contrary to prior thinking that high levels of moisture and the resulting steam expansion in the bean during rapid roasting is responsible for the swelling/puffing that results in a reduced density bean.

Without being bound to theory, it is believed that water is a possible contributor to coffee swelling/puffing, but not at the high levels discussed int he prior literature.

In the process of the present invention, green coffee beans having an initial moisture content greater than about 10%, preferably greater than about 10% to about 14%, most preferably greater than about 10% to about 12%, are first dried to a moisture content of from about 0.5 to about 10%, preferably from about 2% to about 7%, more preferably from about 2% to about 6%, more preferably from about 3% to about 6%, and most preferably about 3% to about 5%.

The drying stage, according to the present invention, results in partially dehydrated coffee bean without causing any significant roasting-related reactions to take place. Roasting reactions are described in Sivetz, supra, pp. 250-262, incorporated herein by reference.

Without being bound by theory, it is believed that the key to the pre-drying step of the present invention is that the moisture content of the resulting beans is relatively uniform throughout the bean, i.e. the moisture profile within the beans has equilibrated. Accordingly, the method of pre-drying is not critical, provided the moisture content of the resulting bean is uniformly low and no burning or roasting occurs. Beans with high mcisture contents in their center and low moisture contents near the outer edges should not be charged to the roaster until such equilibration occurs.

Green bean drying involves the simultaneous application of heat and removal of moisture from the green beans. As applied to the present invention, moisture removal, i.e. dehydration, can be accomplished by heated air, heated surfaces, microwave, dielectric, radiant or freeze dryers. These drying operations are described in Fellows, *Food Processing Technology*, Chapters 14, 17 and 20, incorporated herein by reference. The preferred drying method is heated air drying; however, inert gases (e.g. helium and nitrogen) can also be used. Fluidized bed heated air dryers, rotary dryers, belt dryers, tray dryers, continuous dryers and conveyor and convective dryers are particularly preferred; rotary or belt dryers are most preferred.

Fluidized bed dryers may be batch or continuous. Continuous fluidized bed dryers can be filled with a vibrating base to help to advance the beans. Continuous "cascade" systems, in which the beans are discharged under gravity from one tray to next can be used for higher production rates. Fluidized bed dryers suitable for use in the present invention include those manufactured by APV Crepaco, Inc., Attleboro Falls, Mass.; Bepex Corp., Rolling Meadows, Ill.; Littleford Bros., Inc., Florence, Ky.; and Wolverine Corporation, Merrimac, Mass.

Rotary dryers consist of a slightly inclined rotating metal cylinder, fitted with internal flights to cause the beans to cascade through a stream of hot air as they advance through the dryer. Air flow can be parallel to counter-current to the beans. Rotary dryers suitable for use in the present invention include those manufactured by APV Crepaco. Inc., Tonawanda, N.Y.; Aeroglide Corp., Raleigh, N.C.; Blaw-Knox Food & Chemical Equipment Co., Buflovak Division, Buffalo, N.Y.; and Littleford Bros. Inc., Florence, Ky.

Belt dryers suitable for use in the present invention include those manufactured by APV Crepaco, Inc., Attleboro Falls, Mass.; The National Drying Machinery Co., Philadelphia, Pa.; C. G. Sargent's Sons Corp., Westford, Mass.; Aeroglide Corp., Raleigh, N.C.; and Proctor & Schwartz, Inc., Horsham, Pa. Chamber dryers suitable for use in the present invention include those manufactured by Wyssmont Company, Inc., Fort Lee, N.J. Continuous conveyor dryers suitable for use int he present invention include those manufactured by APV Crepaco, Inc., Attleboro Falls, Mass.; The National Drying Machinery Co., Philadelphia, Pa.; C. G. Sargent's Sons Corp., Westford, Mass.; The Witte Co., Inc., Washington, N.J.; Wyssmont Company, Inc., Fort Leed, N.J.; Proctor & Schwartz, Inc., Horsham, Pa.; Wenger Mfg. Inc., Sabetha, Kans.; Werner & Pfleiderer Corp., Ramsey, N.J.; and Wolverine Corp., Merrimac, Mass. Convective dryers suitable for use in the present invention include those manufactured by APV Crepaco, Inc. Tonawanda, N.Y.; The National Drying Machinery Co., Philadelphia, Pa.; Wyssmont Company, Inc., Fort Lee, N.J.; Proctor & Schwartz, Inc., Horsham, Pa.; and Wenger Mfg. Inc., Sabetha, Kans.

The drying step should be conducted under gentle conditions. Large heat inputs and temperature differentials can result in tipping and burning of the bean or premature roast-related reactions. Drying curves for a typical blend of green coffee beans with an initial moisture content of 11% are shown in FIG. 1. The drying curve was established on a Model 42200 Wenger Belt Dryer under 300 lb. batch conditions. The blend consists of equal parts Robusta, natural Arabicas and washed Arabica beans. Preferably, commercial drying is achieved by a convective air stream, which enters the drying compartment containing from 0% to 70% moisture at a temperature of from about 70° F. to about 325° F., preferably from about 70° F. to about 300° F., more preferably from about 120° F. to about 275° F., and most preferably about 160° F. to about 250° F. The drying time should be from about 1 minute to about 24 hours, preferably from about 30 minutes to about 24 hours, more preferably from about 1 hour to about 24 hours, more preferably from about 1 hour to about 12 hours, more preferably from about 1 hour to about 6 hours, and most preferably from about 2 hours to about 6 hours.

Slow drying using conventional drying units, like the ones described above, are easily fitted into existing commercial roasting lines and are the preferred commercial embodiment of the present invention. However, other drying schemes which achieve the same uniformity of moisture will produce a similar result and are also contemplated by the present invention. Examples of alternative drying schemes include: vacuum drying; warehouse-type drying (i.e. storage in a dehumidified warehouse for several months); or pulse drying by heating the beans with one or more short pulses of heat, e.g., 1 sec. −1 min. at 300°-1000° F. (149° C.-538° C.), and then allowing the moisture and temperature within the bean to equilibrate.

Warehouse-type drying can be performed in large rooms, warehouse or storage silos. The coffee may remain in the shipping bag provided air is free to flow in and out of the bag (e.g. a coarse weave burlap bag). Slow drying of this type is typically accomplished with air at about 70° to about 120° F. (about 21° to about 49° C.) and a relative humidity of less than 25%. Optionally, a small air flow is distributed throughout the drying environment. The time required to achieve desired moistures is a function of air distribution, air velocity, air temperature, air relative humidity and the initial moisture content of the green beans. Typically, the moisture levels are monitored periodically during the warehouse-type dryer period. The drying medium is not limited to air; inert gases (e.g. nitrogen and helium) can also be used.

After the green coffee beans have been uniformly pre-dried and the moisture profile has equilibrated, they are ready for roasting. The beans should have minimal contact, preferably no contact, with moisture to prevent the absorption thereof. The pre-dried beans should not be allowed to rehydrate to a moisture level greater than about 10%, preferably not greater than about 7% and most preferably not greater than about 3%. It is desirable, but not critical, to charge the beans to the roaster as soon as possible after pre-drying.

Roasting of the Dried Beans.

The process of the present invention combines the above predrying stage with a "fast" roaster. These roasters are characterized by their ability to provide an expanded roast bean with a whole roast tamped bulk density of from 0.28 to 0.38 gm/cc.

Fast roasters suitable for use in the present invention can utilize any method of heat transfer. However, convective heat transfer is preferred, with forced convection being most preferred. The convective media can be an inert gas or, preferably, air. Typically, the pre-dried beans are charged to a bubbling bed or fluidized bed roaster where a hot air stream is contacted with the bean. Fast roasters operate at inlet air temperature of from about 350° to about 1200° F. (about 177° to about 649° C.) preferably from about 400° to about 800° F. (about 204° to about 427° C.), at roast times form about 10 seconds to not longer than about 5.5 minutes, preferably from about 10 to about 47 seconds.

In a typical batch fast roast, a Thermalo Model 23R roaster manufactured by Jabez Burns, is charged with from about 100 to about 300 lbs. (from about 14 to about 136 kg) of dried beans. The beans are roasted for from 1 to about 3 million Btu/hr (about 293 kW to about 879 kW) and an initial preheat temperature of from about 300° to about 700° F. (about 149° to about 371° C.).

In a typical continuous fast roast, a Jetzone Model 6452 fluidized bed roaster, manufactured by Wolverine Corp., is operated with an inlet air temperature of from about 500° to about 700° F. (about 260° to about 371° C.) and a residence time of from 15 to about 60 sec at typical burner rates of about 2.4 MM Btu/hr (about 703 kW).

Roasting equipment and method suitable for roasting coffee beans according to the present invention are described, for example, in Sivetz, *Coffee Technology*, Avi Publishing Company, Westport, Conn. 1979, pp. 226-246, incorporated herein by reference. See also U.S. Pat. No. 3,964,175 to Sivetz, issued Jun. 22, 1976, which discloses a method for fluidized bed roasting of coffee beans.

Other fast roast methods useful in producing reduced density coffee are described in U.S. Pat. No. 4,737,376 to Brandlein et al., issued Apr. 12, 1988; U.S. Pat. No. 4,169,164 to Hubbard et al., issued Sep. 25, 1979; and U.S. Pat. No. 4,322,447 to Hubbard, issued Mar. 30, 1982, all of which are incorporated herein by reference.

Final roasting according to the present invention is characterized by two factors: the color of the final roast bean, and the density of the product.

Roast Bean Color: The coffee beans can be roasted to any desired roast color. Darker roasts develop strong flavors that are very desirable in many European countries. Lighter roasts can be used to produce clear, reddish cup colors with slightly weaker flavors. The Hunter Color "L" scale system is generally used to define the color of the coffee beans and the degree to which they have been roasted. A complete technical description of the system can be found in an article by R. S. Hunter "Photoelectric Color Difference Meter", *J. of the Optical Soc. of Amer.*, 48, 985-95 (1958). In general, it is noted that Hunter Color "L" scale values are units of light reflectance measurement, and the higher the value is, the lighter the color is since a lighter colored material reflects more light. In particular, in the Hunter Color system the "L" scale contains 100 equal units of division; absolute black is at the bottom of the scale (L=0) and absolute white is at the top (L=100). Thus, in measuring degrees of roast, the lower the "L" scale value the greater the degree of roast, since the greater the degree of roast, the darker is the color of the roasted bean.

The roast coffee beans of the present invention have a Hunter L-color of from about 14 to about 25, preferably from about 17 to about 23.

Reduced Density: The roast coffee beans of the present invention have a whole roast tamped bulk density of from about 0.27 to about 0.38 g/cc, preferably from about 0.29 to about 0.37 g/cc, more preferably from about 0.30 to about 0.36 g/cc, and most preferably from about 0.30 to about 0.35 g/cc.

Cooling the roasted beans.

As soon as the desired roast bean color is reached, the beans are removed from the heated gases and promptly cooled by the typically ambient air and/or a water spray. Cooling of the beans stops the roast-related pyrolysis reactions.

Water spray cooling, also known as "quenching", is the preferred cooling method in the present invention. The amount of water sprayed is carefully regulated so that most of the water evaporates off. Therefore, minimal water is absorbed by the roasted beans, e.g. typically less than about 6%.

Grinding of the roasted beans

After the roast coffee beans have been cooled according to the present invention, they can be prepared for brewing. Coffee brewing is achieved by percolation, infusion or decoction. During a brewing operation, most coffee solubles and volatiles are extracted into an aqueous medium. This extraction is made more efficient by breaking down the whole bean into smaller pieces. This process is generally referred to as "grinding". Preferred grinding techniques result in an average particle size of from about 300 to about 3000 microns.

Particle size also impacts the brew strength of coffees prepared from different brewing apparatus. Automatic Drip coffee grinds typically have an average particle size of about 900 $\mu$m and percolator grinds are typically from about 1500 $\mu$m to about 2200 $\mu$m.

Descriptions of grinding operations suitable for use in the present invention are described in Sivetz, supra. pp. 265-276, incorporated herein by reference.

The roast and ground coffee beans of the present invention have a ground tamped bulk density of from about 0.25 to about 0./39 gm/cc, preferably from about 0.28 to about 0.36 gm/cc, and most preferably from about 0.28 to about 0.34 gm/cc.

Flaking of the resulting ground & roast coffee

Recent developments have lead to "flaked" coffees with improved characteristics. Flaked coffee is described in: U.S. Pat. No. 4,331,696; U.S. Pat. No. 4,267,200; U.S. Pat. No. 4,110,485; U.S. Pat. No. 3,660,106; U.S. Pat. No. 3,652,293; and U.S. Pat. No. 3,615,667, of which are incorporated herein by reference.

Flaked ground & roast products of the present invention are desirable. Preferred flaked products are produced by grinding the roast coffee to an average particle size from about 300 to about 3000 $\mu$m, normalizing the ground product, and then milling the coffee to a flake thickness of from about 2 to about 40 thousandths of an inch (about 51 to about 1016 $\mu$m), preferably from about 10 to about 30 (about 254 to about 762 $\mu$m), most preferably from about 20 to about 24 (about 508 to about 610 $\mu$m).

Characteristics of the Roasted Products

The benefits of the present invention are observed by "fast roasting" the beans to produce a reduced density roast bean. Surprisingly, it has been discovered that when green beans are pre-dried prior to roasting according to the present invention, the resulting roasted beans exhibit the following characteristics:

More Uniform Roasting: The roasted beans produced according to the present invention show a high degree of roast uniformity when compared to non-dried beans roasted in a similar manner.

Less Bean to Bean Color Variation: Bean-to-bean color variation within the roast is an indication of uniformity of roast. Color variations within the bean are also another indicator of roast uniformity. Both are important to the aesthetic appeal of the coffee to the consumer.

The Hunter L-scale system is employed in the present invention to establish uniformity of roast within the bean. Hunter L-color of the roast bean is normally lower than that of the ground product. The reason for this effect is that the exterior of the roast bean is roasted to a greater degree (i.e. darker) than the interior of the bean. As used herein, the term Hunter $\Delta$L-color relates to this increase int eh Hunter L-color of roast beans when compared after and before grinding and is defined as follows:

Hunter $\Delta$L-color = $L_{after} - L_{before}$ where, $L_{before}$ = Hunter L-color of the whole roast bean; and
$L_{after}$ = Hunter L-color of the ground roast bean.

Hunter $\Delta$L-color values for roast and ground coffee according to the present invention are less than about 1.2, preferably less than about 0.6.

Increased Flavor Strength: The brew flavor strength of the coffees produced by the present invention is typically greater than that produced by prior 16-ounce coffee blends, and even fast roast non-dried reduced density coffee blends.

Roast Time Reduction: Reduced roast bean densities are achieved under the roast conditions described above in from about 10 seconds to about 30 minutes, preferably from about 10 seconds to about 5.5 minutes, most preferably about 10 to about 47 seconds. It has been observed that the roasting times of the present invention are about ⅔ those observed when no pre-drying is utilized.

Preferred Coffee Varieties

It has been observed that the process of the present invention is suitable for roasting all varieties of coffee. However, the flavor character of certain coffee is actually improved by the claimed process. Molds and washed arabicas show a slight improvement, while Brazilians and other natural Arabicas show more improvement. Robustas are improved the most and have a noticeably less harsh flavor. Accordingly, Brazilians, natural Arabicas, washed Arabicas and Robustas are preferred beans for use in the present invention. Robustas being the most preferred.

The blending of beans of several varieties, before and after roasting or pre-drying, is also contemplated by the present invention. Likewise, the processing of decaffeinated or partially decaffeinated coffee beans are also contemplated by the present invention.

ANALYTICAL METHODS

I. Whole Roast Tamped Bulk Density Determination

This method specifies the procedure for determining the degree of puffing that occurs int he roasting of green coffee. This method is applicable to both decaffeinated and non-decaffeinated whole roasts.

Apparatus
  Weighing container: 1,000 ml stainless steel beaker or equivalent
  Measuring container: 1,000 ml plastic graduated cylinder; 5 ml graduations
  Scale: 0.1 gm sensitivity
  Vibrator: Syntrol Vibrating Jogger; Model J-1 or equivalent. Syntron Company - Homer City, Pa.

Funnel: Plastic funnel with tip cut off to about 1" outlet

Automatic Timer: Electric, Dimco-Gray; Model No. 171 or equivalent

Operation

Weigh 200 grams of whole bean coffee to be tested into beaker. Place the graduated cylinder on the vibrator. Using the funnel, pour the coffee sample into the cylinder. Level the coffee by gently tapping the side of the cylinder. Vibrate 30 seconds at No. 8 setting. Read volume to nearest 5 ml.

Tamped density can be determined by dividing the weight of the coffee by the volume occupied (after vibrating) in the graduated cylinder.

$$\text{Tamped Density} = \frac{\text{Weight of Coffee (gms)}}{\text{Volume of Coffee (cc)}}$$

For standardizing the measurements between different coffees, all density measurements herein are on a 4.5% adjusted moisture basis. For example, 200 grams of whole bean coffee having a 2% moisture content would contain 196 grams of dry coffee and 4 grams of water. If the volume was 600 cc's, the unadjusted density would be 200 gms/600 cc's=0.33 gm/cc. On a 4.5% adjusted moisture basis, the calculation is: 4.5%×200 gms=9 gms water. To make the density calculation on an adjusted moisture basis, take 196 gms dry coffee+9 gms water=205 gms total. Adjusted density=205 gms/600 cc's=0.34 gm/cc.

II. Ground Tamped Bulk Density Determination

This method is applicable to ground or flaked product.

Apparatus

Weighing container: 1,000 ml glass beaker or equivalent

Measuring container: 1,000 ml plastic graduated cylinder; 10 ml graduations

Scale: 0.1 gm or 0.01 ounce sensitivity

Vibrator: Syntron Vibrating Jogger-Model J-1A (or equivalent). Syntron Company-Homer City, Pa. (Calibrated by Factory analytical Services)

Funnel: Plastic funnel with tip cut off to about 1" outlet hole.

Automatic timer (optional): automatic timer-automatic shutoff and reset.

Calibration device: Amplitude Meter and Transducer Mod. AM-100, Power Time Control, Indiana, Pa.

Calibration of Syntron Vibrating Jogger

An amplitude of 0.035 inches results in consistent density measurements with little product break-up when using the 300 gram density method.

Operation

Weigh 300 grams of coffee to be measured into the beaker. Place the graduate cylinder on the vibrator table. Pour the coffee through the funnel into the graduate cylinder. Level the coffee by gently tapping the side of the cylinder. Vibrate for one minute. Read volume.

Calculation $$\text{Tamped Density in gm/cc} = \frac{300 \text{ gm}}{\text{Volume of coffee in ml}}$$

The density measurements used herein are calculated on a 4.5% adjusted moisture basis, as described in the previous section.

The following examples are specific embodiments of the present invention but are not intended to limit it:

EXAMPLE 1

Thermalo Roast

A blend of green coffee beans with an initial moisture content of 11%, consisting of ⅓ washed Arabicas, ⅓ natural Arabicas, and ⅓ natural Robustas are pre-dried at 250° F. (121° C.) for 2 hours on a Wenger belt dryer. The pre-dried beans are then roasted in a Thermalo roaster, Model Number 23R, manufactured by Jabez Burns, under fast conditions using 100 lb. batches (45 kg) and a gas burner input rate of 1.7 million Btu/hr (498 kW). Roasting time of 120 seconds is sued. Whole roast tamped bulk density is less than 0.35 g/cc. The whole roast beans have a Hunter L-value of 19. The roast beans are then water quenched. The quenched coffees are then cracked, normalized and ground to an automatic drip coffee grind of 900 μm and flaked to 20 thousandths of an inch (508 μm) flake thickness. The ground tamped bulk density is less than 0.335 g/cc and the Hunter ΔL is less than 0.6. The flavor strength of the resulting coffee is greater than that of an 11.5 oz. ground and roast coffee produced without predrying.

EXAMPLE 2

Jetzone Fluidized Bed Roast

Green Robusta coffee beans are pre-dried at 160° F. (71° C.) for 6 hours in a Wenger belt dryer at a feed rate of 1300 pounds (590 kg) per hour. Next, the pre-dried beans are cooled with dry ambient air and then roasted at 600° F. (315° C.) for 47 seconds on a Jetzone fluid bed roaster, Model 6452, manufactured by Wolverine Corp. with a burner rate of 2.4 mm Btu/hr (703 kW) and an air recycle of 400 cfm (11,300 liters/min.). The roast beans are cooled to ambient temperature with 70° F. (21° C.) air at a relative humidity of 40%. The resulting whole roast tamped bulk density is 0.34 g/cc and the Hunter L-value is 19.

EXAMPLE 3

Fluidized Bed Roast

Pre-dried coffee beans, prepared according to Example I, are fast roasted in a Jetzone, Model 6452, two-stage, fluidized bed, continuous coffee roaster manufactured by Wolverine Corp. at 440°-470° F. (227° to 243° C.) for 50 seconds in the first stage, and 515°-545° F. (268° to 285° C.) for 50 seconds in the second stage. The roaster is operated at a 1070 pound (486 kg) per hour feed rate and at a 2.4 btu/hr (703 kW) burner rate. The roast beans are cooled to ambient temperature with 70° F. (21° C.) air at a relative humidity of 40%. The resulting whole roast tamped bulk density is 0.38 and the whole roast Hunter L-color is 22. The beans are then ground to an automatic drip coffee grind of 900 μm. The Hunter ΔL value is less than 0.6 and the ground tamped bulk density is 0.36. The flavor strength of the resulting coffee is greater than that of a 13-oz. ground and roast coffee prepared without predrying.

EXAMPLE 4

Thermalo Roast

Three batches of green coffee beans with an initial moisture content of 11% are pre-dried at 160° F. (71° C.) for 6 hours on a Wenger belt dryer. The batches consist of a natural Arabica batch, A Robusta batch and a washed Arabica batch. The pre-dried beans are then roasted on a Thermalo roaster, Model Number 23R, manufactured by Jabez Burns, under fast conditions using 100 lb. (45 kg) batches and a gas burner input rate of 1.7 million Btu/hr (498 kW). A roast time of 120 seconds is used. Whole roast tamped bulk density is less than 0.35 g/cc. The roast beans are then water quenched an the three batches are combined in equal proportions. The whole roast Hunter L value is in the range of from 17 to 22. The quenched coffees were then cracked, normalized and ground to an automatic drip coffee grind of 900 μm, and flaked to 20 thousandths of an inch (508 μm) flake thickness. Ground tamped bulk density is less than 0.335 g/cc and the Hunter ΔL value is less than 0.6. The flavor strength of the resulting coffee is greater than that of a 10 oz. ground and roast coffee prepared without predrying.

EXAMPLE 5

The roast coffee of Example 2 is ground using a Gump Model 666 grinder manufactured by Modern Press. The grinding conditions are set to yield an average particle size of from 300 to 3000 μ. The resulting Hunter ΔL is less than 0.6. The flavor strength of the resulting coffee is greater than that of an 11.5 oz. ground and roast coffee.

EXAMPLE 6

The ground and roast coffee of Example 5 is flaked using an 18"× 33" Ross roll mill hydraulic flanking unit manufactured by Ross Equipment Co. The milling gap is set to yield a flake thickness of from 2 to 40 thousandths of an inch (51 to 1016 μm).

What is claimed is:

1. A process for producing reduced density roasted coffee beans comprising the steps of:
    (a) first, drying green coffee beans to a moisture content of from about 0.5% to about 7% by weight, wherein the drying is conducted at a temperature of from about 70° F. to about 325° F. for at least about 1 minute; then
    (b) roasting the dried beans at a temperature of from about 350° F. to about 1200° F. for from about 10 seconds to not longer than about 5.5 minutes; and then
    (c) cooling the roasted beans, wherein the resulting roast beans have:
        (1) a Hunter L-color of from about 14 to about 25;
        (2) a Hunger Δ L-color of less than about 1.2; and
        (3) a whole roast tamped bulk density of from about (0.27 to about 0.38 g/cc.

2. A process according to claim 1 in which drying step (a) is conducted for from about 1 minute to several months.

3. A process according to claim 1 in which drying step (a) is conducted at from about 120° F. to about 275° F. for from about 1 hour to about 24 hours.

4. A process according to claim 1 in wherein the coffee beans are non-decaffeinated.

5. A process according to claim 3 wherein the coffee beans are non-decaffeinated.

6. A process according to any of claims 1, 3 or 4 wherein roasting step (b) is conducted at a temperature of from about 400° F. to about 800° F. for from about 10 seconds to about 3 minutes.

7. A process according to any of claims 1, 3 or 4 wherein the dried green coffee beans have a moisture content of from about 3% to about 6% after step (a).

8. A process according to claim 1 in which drying step (a) is conducted at from about 160° F. to about 250° F. (about 71° C. to about 121° C.) for from 1 to 6 hours.

9. A process according to any of claims 1, 3 or 4 in which the whole roast tamped bulk density of the roasted beans if from abut 0.30 to about 0.35 gm/cc.

10. A process according to any of claims 1, 3 or 4 comprising further the step of: (d) grinding the cooled beans to an average particle size of from about 300 to about 3000 μm.

11. A process according to claim 10 further comprising the step of: (e) flaking the ground beans.

* * * * *